United States Patent
Denz

(10) Patent No.: US 6,338,321 B1
(45) Date of Patent: Jan. 15, 2002

(54) ELECTRONIC DEVICE FOR CONTROLLING GAS EXCHANGE VALVES OF AN INTERNAL COMBUSTION ENGINE WITH VARIABLE OPENING FUNCTIONS

(75) Inventor: Helmut Denz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,751

(22) PCT Filed: Jul. 15, 1999

(86) PCT No.: PCT/DE99/02161

§ 371 Date: Jan. 16, 2001

§ 102(e) Date: Jan. 16, 2001

(87) PCT Pub. No.: WO00/04280

PCT Pub. Date: Jan. 27, 2000

(30) Foreign Application Priority Data

Jul. 15, 1998 (DE) .......................... 198 31 655

(51) Int. Cl.⁷ .............................. F01L 9/04; F02D 13/02
(52) U.S. Cl. ................... 123/90.15; 123/90.11; 73/116; 73/117.3; 73/118.2
(58) Field of Search ............... 123/90.11, 90.15; 73/116, 117.2, 117.3, 118.1, 118.2

(56) References Cited

U.S. PATENT DOCUMENTS 5,635,634 A * 6/1997 Reuschenbach et al. ... 73/118.2
5,644,073 A    7/1997 Matsuno et al. .......... 73/118.1
5,769,043 A * 6/1998 Nitkiewicz ............... 123/90.11

FOREIGN PATENT DOCUMENTS

| DE | 40 38 346 | 6/1992 |
| EP | 0 376 716 | 7/1990 |
| WO | WO 91 08384 | 6/1991 |
| WO | WO 92 02712 | 2/1992 |

* cited by examiner

Primary Examiner—Wellun Lo
(74) Attorney, Agent, or Firm—Walter Ottesen

(57) ABSTRACT

An electronic arrangement for controlling gas exchange valves of an internal combustion engine with variable valve control is presented. The valve control makes possible to completely hold closed at least the inlet valves and the electronic arrangement is equipped with means for detecting the air quantity, which is inducted by the engine, and with means for detecting the valve stroke. The electronic control arrangement changes the opening function in overrun operation starting from the fully closed inlet valves so that an opening of the inlet valves takes place and the arrangement detects the index of the valve opening at which a reaction of the air quantity detection takes place and uses this index as a reference point for determining the actual opening cross section.

10 Claims, 4 Drawing Sheets

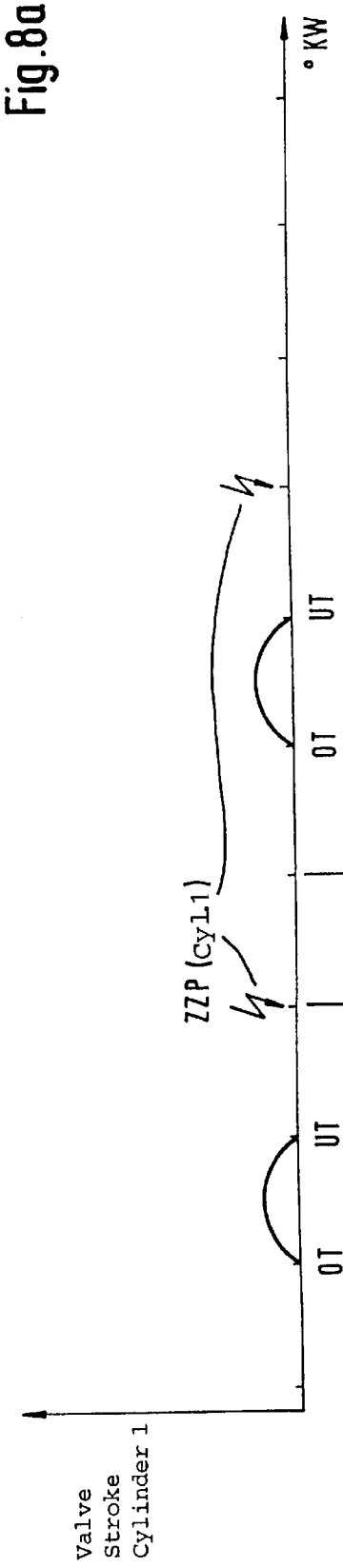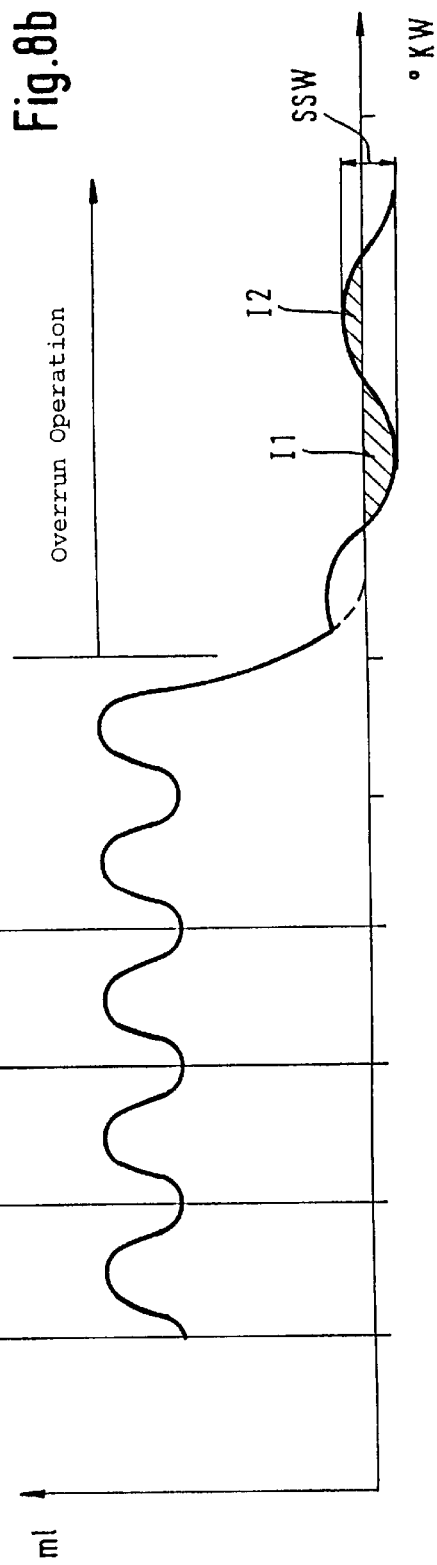

ELECTRONIC DEVICE FOR CONTROLLING GAS EXCHANGE VALVES OF AN INTERNAL COMBUSTION ENGINE WITH VARIABLE OPENING FUNCTIONS

BACKGROUND OF THE INVENTION

The invention relates to a variable control of the gas exchange in internal combustion engines. The term "gas exchange" characterizes the periodic exchange of the cylinder charge, that is, the discharge of exhaust gas and the inflow of an air/fuel mixture. In conventional internal combustion engines, the gas exchange control takes place via spring loaded valves which are opened by a camshaft. The opening function as a time-dependent trace of the valve opening (that is, start, duration and extent of the opening cross section) is determined by the form of the camshaft. In conventional engines, the opening function can therefore be very precisely determined by the shape of the camshaft but is not variable. Other systems are known for controlling the gas exchange with variable opening function. U.S. Pat. No. 4,957,074 discloses electromagnetically controlled and hydraulically actuated valves having variable opening function. To eliminate the effects of tolerances and deterioration in the actuation of the valve, the valve stroke is detected by a valve stroke sensor and the detected value is considered when driving the valve. What is problematic here is the allocation of the signal of the valve stroke sensor to the actual valve stroke. For example, offsets can occur in the sensor signal which make a correct allocation difficult. To alleviate this situation, the valve stroke sensor of U.S. Pat. No. 4,957,074 is calibrated after each closing operation. For this purpose, the valve stroke sensor signal is arbitrarily set to zero when there is a missing valve opening signal. This calibration is correct when the valve is actually closed and this applies when the actuation is intact and the opening signal is missing. In cases wherein the valve does not close in a defective manner, this calibration, however, leads to an incorrect zero point adjustment of the valve stroke sensor.

DE 195 01 386 discloses a variable valve control wherein the opening function of the gas exchange valves is determined by an opening camshaft and a closing camshaft. The opening function can be varied within wide limits via a change of the phase shift between the shafts rotating with the same rotational frequency. The phase shift is changed via a coupling mechanism. In this system, an angle transducer in the valve actuation mechanics can detect the actual movement of the valves or of the valve actuating elements.

Here, the problem arises to allocate the position of the angle transducer to the position of the inlet valves which are opening.

SUMMARY OF THE INVENTION

The object of the invention is the provision of an arrangement which supplies a clear allocation between the start of the opening of the inlet valves and the signal of a valve stroke sensor or angle transducer.

In detail, the following takes place in the control of the gas exchange valves of an internal combustion engine:

the control is variable and makes possible to completely hold closed at least the inlet valves;

the formation of a signal which indicates the air quantity inducted by the engine;

a detection of an index for the valve position;

an opening drive of at least one inlet valve in overrun operation proceeding from completely holding closed the inlet valves;

a detection of the index of the detected valve position wherein a reaction of the signal occurs as a function of the air quantity and a use of this index as a reference point for determining the actual valve position.

The invention thereby makes possible a clear allocation of the signal of a valve stroke sensor to the actual position of the opening inlet valves. This is made possible by a comparison of the signal of the air mass sensor with the signal of the valve stroke sensor. As long as the air mass sensor indicates an air mass flow unequal to zero, a valve lifting is given. In overrun operation wherein no engine torque is needed, the inlet valves can be completely closed so that the engine does not induct any fresh air and the air mass sensor indicates the value zero. Via a test function, the opening signal of the inlet valve for an adequately long overrun operation can be successively increased from the value zero in the direction of inlet valve opening. For an opening signal wherein there occurs, for the first time, a transition from the air mass signal which is constant at zero to a pulsating very low air mass flow, the start of the valve lifting is present. All other valve stroke sensor signals can refer to the signal of the valve stroke sensor occurring at this event.

In this way, the invention makes possible an automatic calibration of a valve stroke sensor or an angle transducer in the valve actuating mechanics. In this way, the necessity of a complex adjustment of the sensor or angle transducer during assembly is unnecessary. Furthermore, the automatic calibration minimizes the requirements as to the tolerances of the sensors.

In one embodiment, the formation of a signal (which indicates the air quantity inducted by the engine) takes place such that the signal of an air mass sensor is averaged over a crankshaft angular region b about the start of a valve lifting which region b is less than the spacing between two sequential ignitions in the engine.

This leads to the advantage of an increased measuring accuracy of the teaching of the invention. This procedure is especially advantageously to be achieved in a throttle-free charge control via the inlet valves (without throttle flap).

The increased sensitivity furthermore permits a detection of smaller pulsations and also a detection of cylinder-specific differences at the start of the valve lifting.

Of special advantage is furthermore the possibility of the diagnosis of the inlet valves as to tight closure. This permits the detection of starting leakages as they are caused, for example, by a valve play which is too little. An indication and/or storage of this fault permits an early correction of the valve play either via an automatic intervention of the electronic valve control or via a visit to a service facility. Costly damage because of burning of the valves as a consequence of deficient heat conduction away via the valve seat can be avoided in this manner.

BRIEF DESCRIPTION OF THE DRAWINGS

The invention will now be explained with reference to the drawings herein.

DESCRIPTION OF THE PREFERRED EMBODIMENTS OF THE INVENTION

Figure 1:
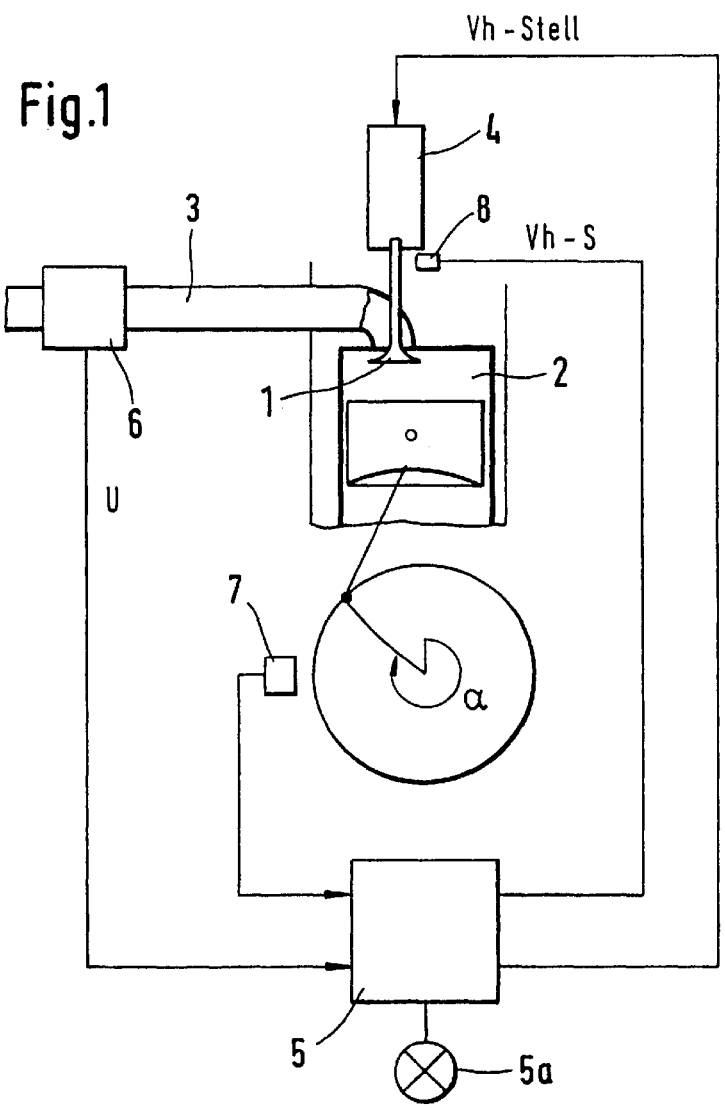
FIG. 1 shows the technical background of the invention.

The 1 in FIG. 1 identifies the inlet valve of an internal combustion engine which connects or separates a combustion chamber 2 of the engine and an inlet channel 3 in a controlled manner. The valve actuation takes place via an actuating element 4 which develops its actuating force, for example, hydraulically or electromagnetically and which is controlled via an electronic control apparatus 5. As input signals, the following are supplied to the control apparatus 5: at least a signal U of an air mass sensor 6, a signal α as to the angular position of the crankshaft from an angle sensor 7 and a signal Vh-S from a valve stroke sensor 8. If the means 5 detects pulsations in the air mass signal for closed inlet valves, then, in one embodiment, an indication and/or a storage of this event takes place with the means 5a which is realized, for example, as a fault lamp.

Figure 2:
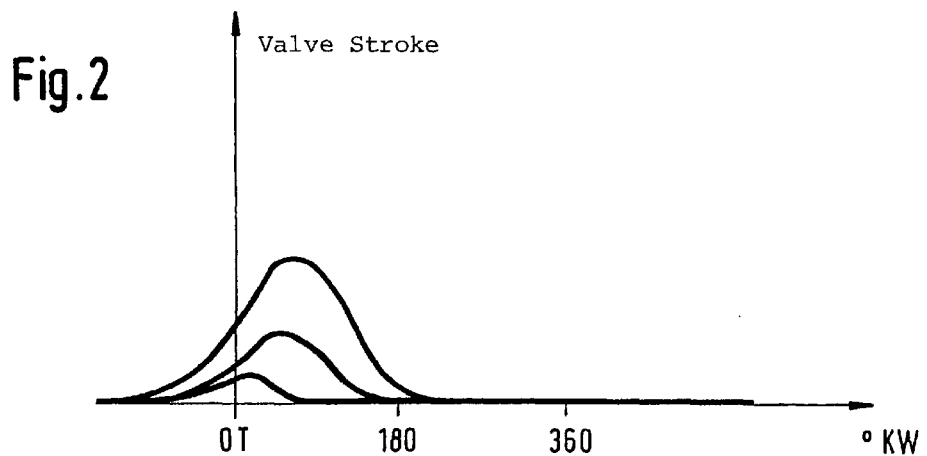
FIG. 2 shows a set of valve lifting curves.

FIG. 2 shows a set of valve lifting curves as it can be adjusted by the electronic control apparatus 5 coacting with the actuating element and the sensor signals. The valve lifting curve results as a definition of the valve stroke as a function of the rotational angle of the crankshaft (° KW). Especially in overrun operation, the gas exchange valves, and therefore especially the inlet valves, can remain completely closed so that the valve stroke is constant at zero.

Figure 3:
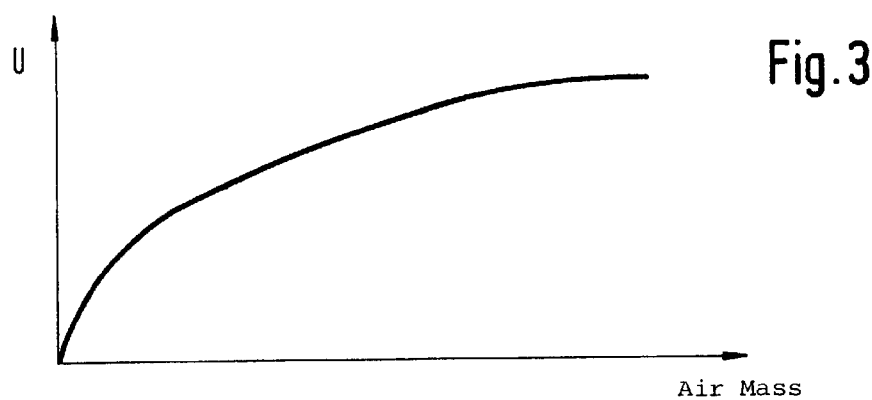
FIG. 3 shows a characteristic line, that is, the signal of an air mass sensor; and, FIG. 4 shows a set of characteristic lines of a valve stroke sensor as it can occur for a slightly variable mounting position of the sensor. A variable mounting position can, for example, occur because of scattering and tolerances during the assembly.

The signal of an air mass sensor, as shown in FIG. 3 as a function of air mass, indicates, in this case, the value zero. Furthermore, the signal reacts with a steep slope to an increase of the air mass from the value zero and is therefore suitable for detecting the start of the air flow at the start of the valve opening.

Figure 4:
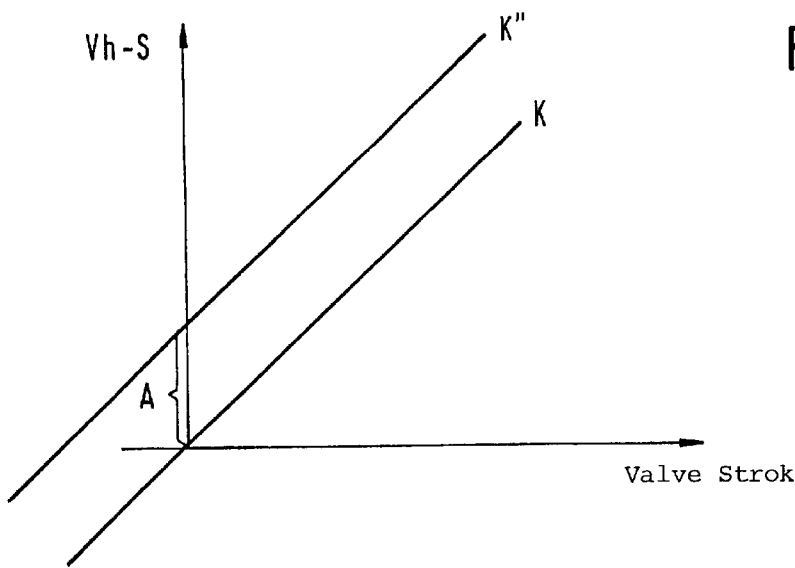

FIG. 4 shows a set of valve stroke sensor signal characteristic lines Vh-S as a function of the actual valve stroke as it can be recorded, for example, in different mounting positions of the same sensors in a series production.

Figure 5:
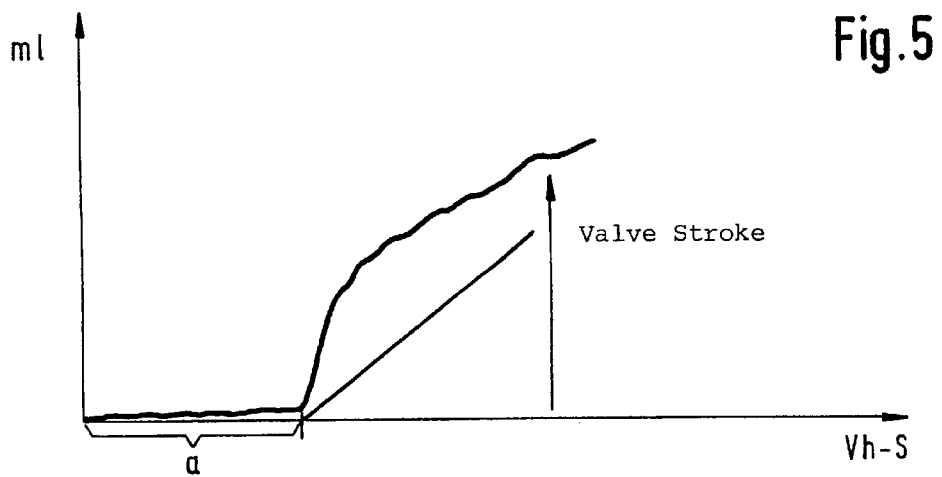
FIG. 5 shows in detail the function of the invention with reference to a parallel illustration of the processed air mass sensor signal ml=f(U) and of the valve stroke signal as a function of the valve opening signal for successive increases of the opening signal.
Figure 6:
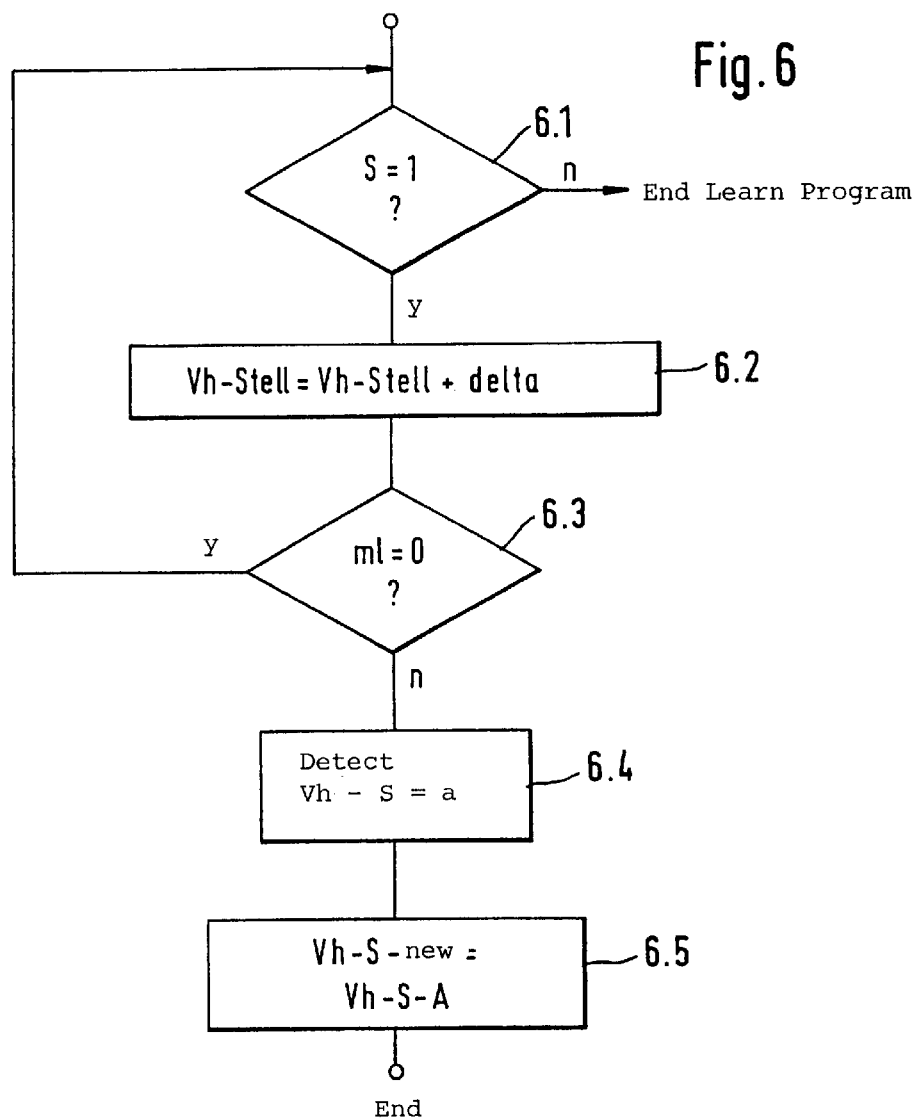
FIG. 6 shows a flowchart as an embodiment of the method of the invention.

FIG. 5 makes clear the calibration of the invention via the definition of the air mass signal ml as a function of the valve stroke signal Vh-S for an increasing opening signal Vh-Stell. In overrun operation, the opening signal Vh-Stell is successively increased starting from zero. In the case shown, the air mass sensor signal does not at first react which indicates that the inlet valve remains in the closed state. The increase of the valve stroke signal can, for example, occur when the valve stroke sensor is not mounted directly on the valve but on a transmitting element which is burdened with mechanical play. Only after reaching the value A does the illustrated reaction of the air mass sensor occur and thereby shows the start of an opening of the inlet valves. The corresponding value a of the valve stroke signal is detected by the electronic control apparatus 5 and is allocated to the start of the valve lifting. The reaction, which is shown in FIG. 5, corresponds to the characteristic line K" in FIG. 4. Thereafter, all detected valve strokes can be referred to the learned zero point in the valve lifting in a further control of the valve opening in the normal operation of the engine. This corresponds to a computed shifting of the characteristic line K" from FIG. 4 into the zero point, that is, into the position of the characteristic line K. The sequence of the method of the invention is shown in FIG. 6. In a step 6.1, a check is made as to whether overrun operation is present. This is the case when a variable S has the value 1. Thereafter, a successive increase of the opening signal Vh-Stell takes place by an amount delta (step 6.2). Thereafter, an inquiry of the air mass signal takes place in step 6.3. As long as the air mass signal remains at zero, the step sequence 6.1, 6.2 and 6.3 is gone through repeatedly and thereby the opening signal Vh-Stell is successively further increased. In the instant, in which the air mass signal ml deviates from zero, step 6.3 branches to step 6.4 in which the corresponding signal of the valve stroke sensor Vh-S is detected. This value is identified as A and is stored. All further signals of the valve stroke sensor are corrected with this stored value A which is shown in step 6.5 with the equation Vh–S_new= Vh–S—A.

The air mass signal is obtained from the voltage supplied by the means 6. The voltage U is typically scanned in a 1 ms raster and is averaged to the value ml over a larger crankshaft angular region. The crankshaft angular region includes, for example, the spacing between two ignitions which, for a 4-cylinder engine, corresponds to a crankshaft angular region of approximately 180°. In contrast, 1 ms corresponds to an angular region of approximately 11° for an engine speed of 800 rpm.

Figure 7:
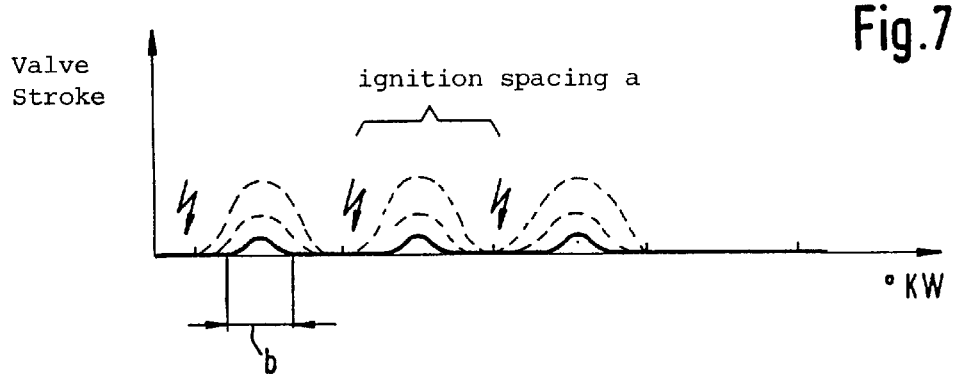
FIG. 7 shows traces of U as a function of the rotational angle ° KW of the crankshaft for different valve lifting curves; and, FIGS. 8a and 8b show a correlation between the valve lifting and the air mass signal for an inlet valve which is not tight.

To improve the measuring accuracy, the formation of the mean value of U does not take place over the entire ignition spacing a in one embodiment of the invention; instead, the formation is carried out over only a limited crankshaft angular region b about the start of valve lifting. FIG. 7 shows the traces of U as a function of the rotational angle ° KW of the crankshaft for different valve lifting curves.

The increase of the sensitivity which results from the mean value formation over a smaller region, is especially to be achieved for throttle-free charge control via the inlet valve lifting. For throttle-free charge control, no throttle flap and therefore no induction volume, which is spatially limited by a throttle flap, is present which attenuates the pulsations. Accordingly, also very small pulsations near the value zero are still detectable in the signal of the air mass sensor.

In this way, an increase of the accuracy is possible in that not only the change of the averaged air mass flow is observed but, for the adaption of the valve stroke sensor signal to the actual valve opening, a mean value formation of the air flow signal takes place only in a specific crankshaft angular range.

Accordingly, already smaller pulsations and also cylinder-specific differences can be detected in the pulse start and therefore in the valve lifting. This makes possible a corresponding valve-individual corrective capability for a valve-individual intervention possibility on the opening function. For a control of the opening functions of several valves via a coupling transmission, an indication for the customer service is conceivable which supplies data for valve play adjustment.

A further possibility lies in the diagnosis of untight inlet valves. For this purpose, monitoring can be carried out as to whether a suction-synchronous pulsation on the air mass signal can be detected for a completely inactive drive of the inlet valves. Especially with a hot-film air mass sensor with reverse flow detection, a difference between the leakage air mass flow flowing back and forth through the not completely sealing valve can be detected. This is shown in FIG. 8. An air mass sensor having backflow detection is, for example, known from U.S. Pat. No. 4,468,983 wherein the spatial arrangement of measurement resistances permits a direction distinguishing capability in addition to the detection of the amount of air mass flow.

FIG. 8a shows valve lifting curves for the cylinder 1 of a 4-cylinder 4-stroke engine as a function of the crankshaft angle ° KW. The valve lifting curves of the remaining cylinders are not shown for reasons of clarity. In the right-hand portion of FIG. 8a, no valve opening should take place, for example, because the engine is in overrun operation.

FIG. 8b shows the corresponding trace of the air mass sensor signal U for the case of an untight valve. The signal trace in the left-hand portion of FIG. 8b results from the superposition of the valve liftings of all cylinders. Especially the first-shown maximum results from the induction stroke of the first cylinder. In the right-hand portion of FIG. 8a, the air mass sensor signal U should be constant at zero because here overrun operation with closed valves should be present.

The residual oscillation, which is shown in the right-hand portion of FIG. 8b, shows an inlet valve in cylinder 1 which does not close tightly. The first negative half wave in the right-hand portion of FIG. 8b occurs, as shown with a view to FIG. 8a, after the inlet stroke (charge exchange bottom dead center) and therefore in the compression stroke. For an untight inlet valve, a portion of the cylinder charge is pushed into the intake manifold and is registered by the air mass sensor as a backflow (negative sign). In the next work stroke, the piston draws gas from the intake manifold via the untight inlet valve and this is registered by the air mass sensor with a positive sign. Untight inlet valves are detected by evaluating this characteristic pressure trace. For example, the amount integral (for example, the sum of areas I1 and I2) or the peak-to-peak value (SSW) of the oscillation can be compared to a predetermined threshold value. When this threshold value is exceeded, a fault announcement can be stored as data for a service center which can also be displayed to the driver. In this way, leaks which are just starting can be detected early before greater engine damage occurs because of burnt valves.

What is claimed is:

1. An electronic arrangement for controlling gas exchange valves of an internal combustion engine, the electronic arrangement comprising:

means for completely holding closed at least the inlet valves;

means for forming a signal for indicating the air quantity drawn in by suction by the engine;

means for detecting an index for the valve position;

means for driving the inlet valves to open in overrun operation starting from a complete closure thereof; and, means for using said index of the detected valve position, at which a reaction of the signal occurs as a function of the air quantity, as reference point for the determination of the actual valve position.

2. The electronic control arrangement of claim 1, wherein the means for forming a signal, which indicates the air quantity drawn in by suction by the engine, include an air mass sensor whose signal is averaged over a crankshaft angular region b about the starting of valve lifting which region b is less than the spacing between two sequential ignitions in the engine.

3. An electronic arrangement for controlling the inlet valves of an internal combustion engine, the electronic arrangement comprising:

means for completely holding closed the inlet valves;

means for forming a signal as to the air quantity drawn in by suction by the engine;

means for holding the inlet valves closed in the overrun operation and, in parallel thereto, checking whether the signal as to the air quantity, which is drawn in by suction by the engine, exhibits pulsations which exceed a predetermined extent; and, means for evaluating an exceeding of this predetermined extent as an untight inlet valve.

4. The electronic arrangement of claim 1, wherein the means for detecting the air quantity, which is inducted by the engine, includes an air mass sensor having backflow detection.

5. The electronic arrangement of claim 4, wherein the amount integral or the peak-to-peak value of the signal as a function of the air quantity, which is drawn by suction from the engine, exceeds a predetermined extent.

6. The electronic control arrangement of claim 1, wherein exceeding the predetermined extent is indicated as a fault announcement and/or is stored.

7. A method for controlling gas exchange valves of an internal combustion engine with a variable valve control, which makes possible to completely hold closed at least the inlet valves, the method comprising the steps:

forming a signal which indicates the air quantity inducted by the engine;

detecting an index for the valve position;

driving at least one inlet valve to open in overrun operation starting from a fully closed position of the inlet valves;

detecting the index of the detected valve position wherein a reaction of the signal occurs as a function of the air quantity and using this index as a reference point for determining the actual valve position.

8. The method of claim 7, wherein, to form a signal, which indicates the air quantity, which is inducted by the engine, the signal of an air mass sensor is averaged over a crankshaft angular region b about the start of the valve lifting, which region b is less than the spacing between two sequential ignitions in the engine.

9. A method of controlling inlet valves of an internal combustion engine with a variable valve control which makes possible to completely hold closed the inlet valves, the method comprising the steps:

forming a signal as to the air quantity inducted by the engine, characterized by the further steps of:

parallel to holding closed the inlet valves in overrun operation, checking the signal as a function of the air quantity as to pulsations which exceed a predetermined extent, the air being inducted by the engine;

evaluating exceeding said predetermined extent as a sign for at least one untight inlet valve.

10. The method of claim 9, wherein an exceeding of said predetermined extent is displayed as a fault announcement and/or is stored.

* * * * *

UNITED STATES PATENT AND TRADEMARK OFFICE
CERTIFICATE OF CORRECTION

PATENT NO.     : 6,338,321 B1
DATED          : January 15, 2002
INVENTOR(S)    : Helmut Denz It is certified that error appears in the above-identified patent and that said Letters Patent is hereby corrected as shown below:

<u>Column 6,</u>
Lines 16 and 24, delete "claim 1" and substitute -- claim 3 -- therefor.

Signed and Sealed this

Eighteenth Day of February, 2003

JAMES E. ROGAN
*Director of the United States Patent and Trademark Office*